3,814,656
                                    DIE CONSTRUCTION
Raymond Hanson, Rearsby, and Sydney A. Vinter,
   Leicester, England, assignors to USM Corporation,
   Flemington, N.J.
                  Filed Nov. 11, 1971, Ser. No. 197,781
Claims priority, application Great Britain, Nov. 13, 1970,
                              54,085/70
                          Int. Cl. B32b 31/00
U.S. Cl. 156—380                                       5 Claims

ABSTRACT OF THE DISCLOSURE

A die for operating on workpieces has first and second workpiece supporting surfaces opposed edges of which are in stepped relation to each other for supporting the workpieces in overlapping relation. A shoulder joins the edges of the surfaces for limiting the overlapping relation of the workpieces and a ridge in the one of the surfaces supporting an overlapped workpiece runs substantially parallel to the shoulder to urge workpiece material toward the shoulder.

BACKGROUND OF THE INVENTION

This invention relates to a die for operating upon workpieces. The die is particularly useful in a high frequency press for forming seams in thermoactivatable shoe upper materials.

In many fields of industrial production it is desirable to substitute thermoactivatable materials for those traditionally employed. This desirability in part results from the lower cost and ease of operating upon thermoactivatable materials such as polyvinyl-chloride. However, commercial acceptance of the newer materials has required that they be processed to resemble those traditionally used.

In the shoe industry, for example, commercial acceptance has required the manufacture of uppers which appear to have been traditionally formed. One traditional form of upper has seams in which one layer of leather overlaps another and is stitched together adjacent the overlap, but one of the advantages of thermoactivatable upper material is that overlapping layers may be heat softened to weldingly combine at a much lower cost than forming a traditional stitched seam.

In addition, one type of thermoactivatable material desirably employed in shoe uppers is a composite material having a thermoactivatable layer superimposed upon a backing. When an overlapping seam is formed with this composite material, the backing is visible along an edge of the material overlapping the other; this problem is particularly acute where the backing does not cut evenly but leaves frayed ends of the backing projecting beyond the edge of the workpiece. Such a seam is commercially unacceptable.

Traditional overlapping seams also have the underside portion of a shoe upper at an overlapping seam skived or tapered in thickness to prevent the appearance of a shadow line or bulge in the finished shoe upper along the edge of the upper overlapped by the other material at the seam. Such skiving is an additional operation adding to the expense of the upper which may be avoided by displacing heat softened thermoactivatable material.

SUMMARY OF THE INVENTION

Accordingly, it is an object of the invention to provide a die for operating upon workpieces to produce seams having the appearance of a traditionally formed overlapping seam.

To this end, a die having two workpiece supporting surfaces in stepped relation to each other is provided with a shoulder or riser connecting the surfaces along opposed edges and a ridge a longitudinal center line of which runs substantially parallel to a longitudinal center line of the shoulder. In the preferred embodiment, a pattern of simulated stitches is provided adjacent the shoulder to emboss a pattern resembling stitches on the workpiece. Additionally, the die described in the preferred embodiment is adapted to be used in a high frequency press with thermoactivatable material and is itself molded from a model having features it is desired to reproduce.

BRIEF DESCRIPTION OF THE DRAWINGS

The above and other features of the invention together with novel details and combinations will now be more particularly described in connection with an illustrative preferred embodiment, it being understood that the invention is not limited to the preferred embodiment which is illustrated in the accompanying drawings, in which.

DESCRIPTION OF THE PREFERRED
                               EMBODIMENT

Figure 1:
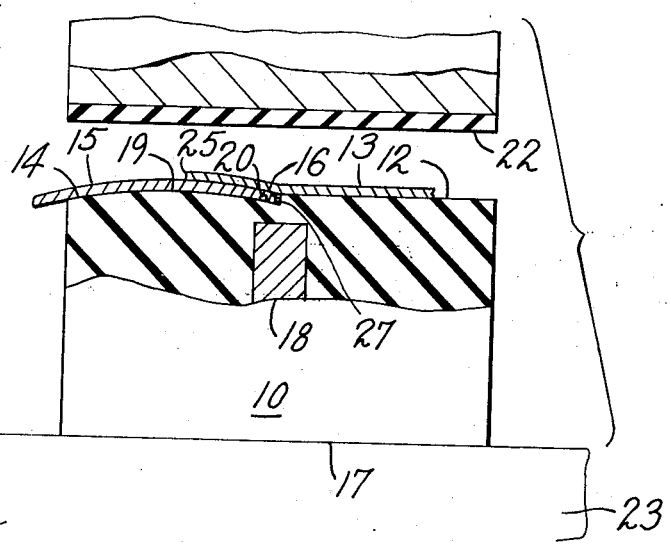
FIG. 1 is a die mounted between platens of a press.
Figure 3:
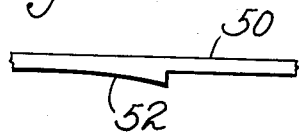
FIG. 3 is a view of a workpiece operated on by the die of FIG. 1.
Figure 4:
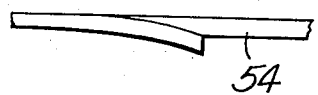
FIG. 4 is a view of workpieces having a traditionally formed overlapping seam.

FIG. 1 illustrates a preferred embodiment of a die 10 having first and second workpiece supporting surfaces 12 and 14 in stepped relation to each other. A shoulder 16 connects opposed edges of the workpiece supporting surfaces. The first surface 12 is essentially planar and is raised above the second surface 14 relative to a base of the die 17 to support a first workpiece 13 in overlapping relation to an overlapped workpiece 15 on the second surface. The second workpiece supporting surface 14 has a ridge 19, a crest of which lies in the plane of the first surface. The die is positioned between upper and lower platens, 22 and 23 respectively, of a high frequency press which may be relatively moved toward each other to apply pressure and high frequency energy to the workpieces on the die. The high frequency energy heat softens the high frequency, thermoactivatable workpieces while the pressure squeezes the workpieces into conformity with the die surfaces. A portion 25 of the overlapping workpiece 13 raised by the ridge before the application of pressure is depressed into the workpiece 15 by the pressure to taper workpiece 13 at end 25 as conventionally done by skiving. Excess workpiece material displaced by this depression flows in a heat softened condition down the surface 14 toward the shoulder to form a stepped portion in the workpiece conformed to the die and platen 22. Where the overlapped workpiece 15 has a backing material which has frayed ends adjacent the edges, an edge 27 is placed on the die in spaced relation to the shoulder. Workpiece material displaced by the depression of edge 25 then flows along the surface 14 to fill the space between the edge 27 of the workpiece 15 and the shoulder 16. The frayed ends are thus encapsulated in thermoactivatable material which assumes a shape in conformity with the die. The workpieces are also sufficiently heat softened to weldingly combine to form a seam. A workpiece which has been operated upon by the die is shown in FIG. 3 to have a smooth face 50 conformed to the platen 22 and a stepped face 52 conformed to the die 10. The joined workpieces thus have the appearance of a conventionally formed overlapped seam shown in FIG. 4 in which the overlapping workpiece 54 has been skived prior to forming the seam.

Figure 5:
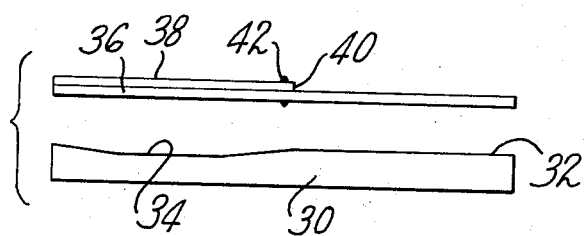
FIG. 5 is a view of a model from which the dies shown in FIGS. 1 and 2 may be molded.

The die 10 may be provided with a feature 20 which it is desired to emboss on the workpieces during the application to the workpieces of high frequency energy and pressure. In shoemaking applications of the invention, the feature is preferably of a row of stitches adjacent and parallel to the shoulder to provide the finished, seamed workpieces with simulated stitches giving the workpiece the appearance of having been stitched together. The overall die surfaces 12 and 14 may be additionally formed with a textured pattern which it is desired to emboss on the workpiece. The appropriate features and textured patterns may be molded into the surfaces 12 and 14 of the die from a model having the features and patterns it is desired to reproduce. The die molding technique may be that described in copending United States patent application Ser. No. 170,046 filed Aug. 9, 1971, now abandoned, in the name of S. A. Vinter. As further illustrated in FIG. 5, the molding technique may employ a base 30 having a depressed surface 34 and an adjacent elevated surface 32 for receiving a model. The model comprises sheets of material 36 and 38 having surface textures it is desired to reproduce. The sheets are assembled in overlapping relation to provide a shoulder mold 40 and provided with features such as stitches 42 which it is desired to reproduce. The sheets are placed in the base 30 to achieve the ridged and planar characteristics of the desired die surfaces 12 and 14. A moldable die material such as silicone rubber is then molded conformably to the model for later use in the press. Silicone rubber having a hardness of 70 Shore A degrees and a temperature stability to 250 degrees C. is acceptable but other materials with different physical characteristics may also be suitable.

After the surface of the model has been covered with moldable die material, an electrically conducting bar 18 may be positioned on the die material and then encapsulated in the die by the addition of further die material. Alternatively, the bar 18 may be inserted in a bore formed in the die after it has been molded. The bar 18 concentrates high frequency energy at its location to facilitate die operation.

Figure 2:
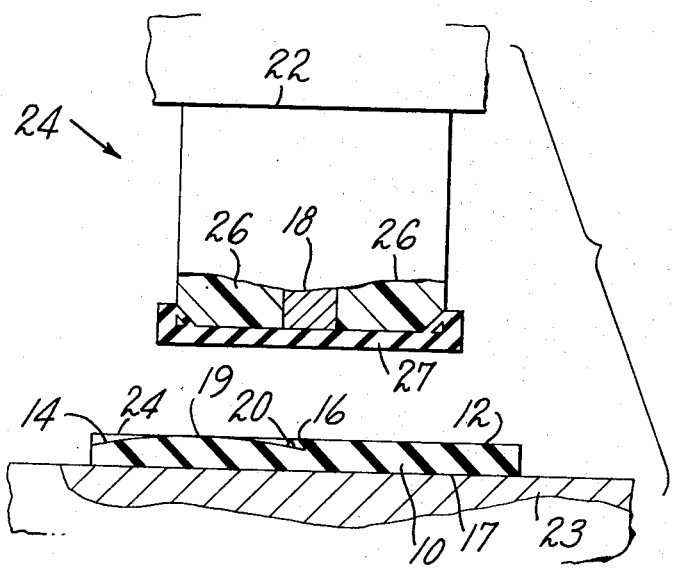
FIG. 2 is an alternative construction of the die shown in FIG. 1 mounted between platens of a press.

In an alternative construction of the die in FIG. 2, the die may be provided with fence portions 24 along edges of the die surface 14. The fence portions prevent workpiece material from oozing over the edges of the die during the application of heat and pressure to the workpieces.

FIG. 2 illustrates a further alternative embodiment of the invention in which the bar 18 for concentrating the high frequency electric field adjacent the shoulder 16 of the die is embedded in a block of material 26 secured to the upper platen 22 of the press.

It should be clearly understood that other embodiments are within the intended scope of the invention. For example, when the die is used to close back seams of shoe uppers, the workpieces 13 and 15 are opposite end portions of a single upper. For such a back seam closing operation the workpiece supporting surfaces are each approximately 1" wide and 3" long and the height of the shoulder is 0.047" which corresponds with a usefully employed thickness of polyvinylchloride coated fabric commonly employed in shoe uppers. In such a die the bar 18 for concentrating the high frequency electric field is made from aluminum ⅜" wide, 1" high and 3" long along the length of the die. The bar is embedded 0.08" from the bottom of the shoulder 16.

The block 26 may be made of a plastic material having a low dielectric loss and high heat resistance such as polypropylene and an acetyl resin. When such materials are used the block 26 is preferably lined with a blanket 27 of silicone rubber for engaging the workpieces. The silicone rubber blanket is preferably .050" thick for solid workpiece materials and .085" thick for poromeric workpiece materials.

Having thus described the invention what we claim as new and desire to secure by Letters Patent of the United States is:

1. A die comprising: first and second die surfaces having opposed edges in stepped relation for supporting workpieces in overlapping relation; a shoulder joining the edges for delimiting workpiece material; said first die surface having a planar portion adjacent said shoulder; and said second die surface having a ridge running substantially parallel to said shoulder and extending substantially to the plane of said first surface for urging workpiece material toward said shoulder.

2. A die as in claim 1 additionally comprising features in one of the surfaces for embossing on the workpiece supported on the surface.

3. A die as in claim 2 wherein the features are in a row parallel to the shoulder for embossing a row of simulated stitches on the workpiece.

4. A die as in claim 1 wherein one of the surfaces has an overall pattern for embossing on the workpiece on the one surface.

5. A die as in claim 1 wherein the die is made from a material having low dielectric losses and additionally comprising a bar of conducting material embedded within the die adjacent the shoulder and remote from the surfaces.

References Cited
UNITED STATES PATENTS

| | | | |
|---|---|---|---|
| 2,401,991 | 6/1946 | Walton et al. | 156—581 |
| 2,962,406 | 11/1960 | Rosa | 156—219 |
| 2,268,262 | 12/1941 | Miller | 156—583 |
| 2,318,702 | 5/1943 | Millar | 156—219 |
| 3,078,201 | 2/1963 | Christie | 156—306 |
| 2,235,981 | 3/1941 | Coe et al. | 156—306 |
| 3,647,587 | 3/1972 | MacDonald | 156—306 |

DOUGLAS J. DRUMMOND, Primary Examiner

U.S. Cl. X.R.

156—581